J. B. Fassett,
Horse Power.
No. 93,813. Patented Aug. 17, 1869.
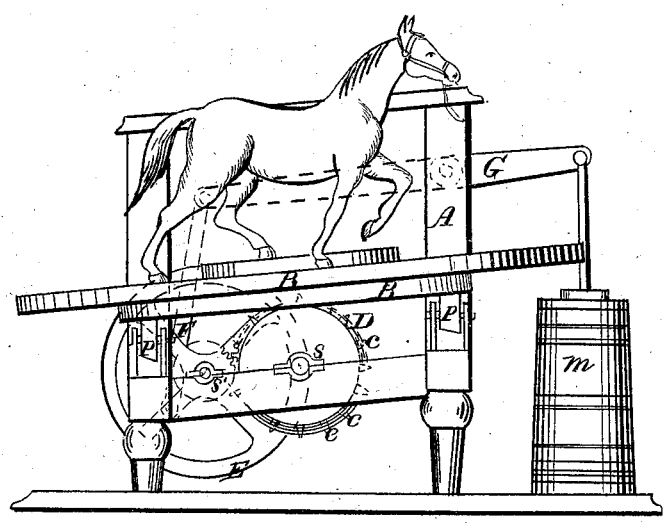
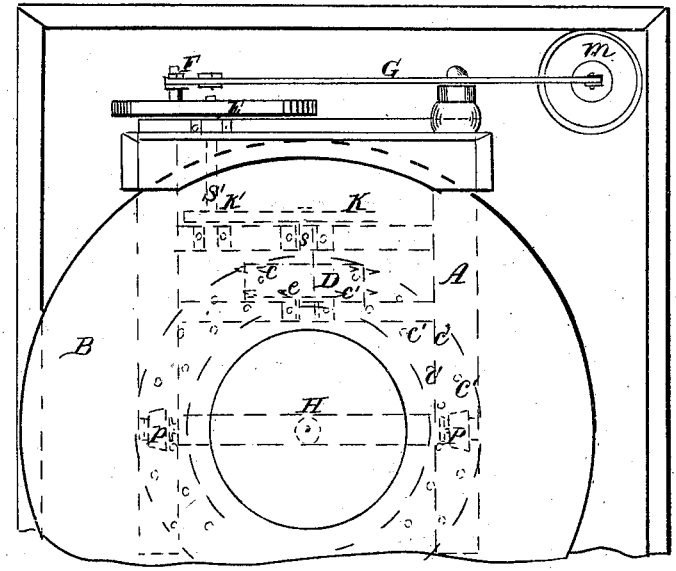
Witnesses
M. S. G. Wilde.
Austin S. Howarth.
John B. Fassett by
Samuel D. Wright
his atty.

United States Patent Office.

JOHN B. FASSETT, OF IRASBURG, VERMONT.

Letters Patent No. 93,813, dated August 17, 1869.

IMPROVED HORSE-POWER.

The Schedule referred to in these Letters Patent and making part of the same.

*To whom it may concern:*

Be it known that I, JOHN B. FASSETT, of Irasburg, county of Orleans, State of Vermont, have invented certain Improvements in Horse-Power; and that the following is a full, clear, and exact description thereof, reference being had to the accompanying drawings, in which—

Figure 1 represents a side elevation of my invention, and

Figure 2, a plan view of same.

The object of my invention is to produce a horse-power, for the use of farmers and others, which shall combine simple construction with durability and power, and ease of management.

The nature of my invention consists in a round platform, upon one side of which the horse travels, revolving upon a friction-wheel, from which power is communicated to shafting.

In the drawings—

A is a frame.

B is a round platform, revolving on the axis H.

This platform is constructed in sections, transverse and horizontal, to give it strength, and prevent its warping. The platform is upon an incline.

Under the platform upon which the horse travels, and between the horse and the centre of the platform, is friction-wheel D, upon which a rim, B', on the platform B, moves in its revolutions. This position of wheel D enables the horse to act upon an increased leverage, thus gaining power; that is, the platform is the lever, the wheel D, the fulcrum, the horse, the power, acting on the long arm, and the machinery to be carried, the weight.

Upon the face of the wheel D, are teeth $c\ c$, which mesh with holes $c'$ in the platform. This is to enable the power to be stopped more readily, and to prevent accidents.

$p\ p$ are friction-rollers, to support and preserve the equal bearings of the platform.

Wheel D is upon shaft S, and upon this shaft is also large cogged wheel K, engaging with small cogged wheel K', on shaft S'.

Upon the opposite end of shaft S' is balance or crank-wheel E, which actuates crank F and arm G, and thus power is carried to the dash of churn $m$, which merely represents an application convenient to be shown, and represents a mill, saw, lathe, or any machinery desirable to operate.

The operation of my invention is simple. The horse travelling upon platform B, which is in position of an inclined plane, revolves the platform, upon wheel D, upon shaft S, thus communicating motion to the gears K and K', and to the crank-wheel E, actuating the crank F and arm G, furnishing power to machinery represented by $m$.

In setting up my power, in a barn, for instance, the platform B can be under a floor or scaffold, leaving uncovered only room enough for the horse to travel, and when the power is not in use, this can be covered by trap or door, so that no room would be lost.

A power, constructed as above described, is very cheap, durable, and easily managed and attached.

What I claim as my invention, and desire to secure by Letters Patent, is—

The combination of platform B, friction-wheel D, constructed and placed as set forth, gears K and K', driving or crank-wheel E, with crank and arm, as shown, and friction-rollers $p\ p$, the whole arranged and operating as an improved horse-power, substantially as described.

In testimony whereof, I have signed my name to this specification, in the presence of two subscribing witnesses.

JOHN B. FASSETT.

Witnesses:
   CARROLL D. WRIGHT,
   AUSTIN S. HOWARTH.